United States Patent [19]
Phelps et al.

[11] 3,957,236
[45] May 18, 1976

[54] METHOD AND APPARATUS FOR TRANSITIONING DIVERSE POWER SOURCES TO RAIL VEHICLES

[75] Inventors: David Reeves Phelps, Alexandria, Va.; Paul Thomas Ryan, Erie, Pa.

[73] Assignee: General Electric Company, Erie, Pa.

[22] Filed: Sept. 25, 1974

[21] Appl. No.: 509,125

[52] U.S. Cl. .......................... 246/187 B; 104/153; 246/186 R
[51] Int. Cl.² .......................................... B61L 3/12
[58] Field of Search ............... 104/148 R, 149, 153; 191/6, 17; 246/187 B, 2 F, 63 A, 40

[56] References Cited
UNITED STATES PATENTS

| | | | |
|---|---|---|---|
| 3,227,870 | 1/1966 | Joyce | 104/153 |
| 3,263,625 | 8/1966 | Midis | 104/148 R |
| 3,771,463 | 11/1973 | Smoot | 104/149 |
| 3,874,301 | 4/1975 | Alimanestianu | 104/149 |

*Primary Examiner*—Trygve M. Blix
*Assistant Examiner*—Reinhard J. Eisenzopf
*Attorney, Agent, or Firm*—D. F. Bigelow

[57] ABSTRACT

Placed near the transition point between power sources of different voltages or frequencies, is a wayside signal producing device which activates an on-board circuit for disconnecting the on-coming vehicle from the power source. When the vehicle has crossed the transition point, another signal producing device causes the vehicle to be connected to the other power source so as to resume power application. When the vehicle is proceeding in the opposite direction the sequence is reversed. In this way a multicar train can have the power source reliably switched in a car-by-car sequence without any appreciable loss in train speed.

14 Claims, 4 Drawing Figures

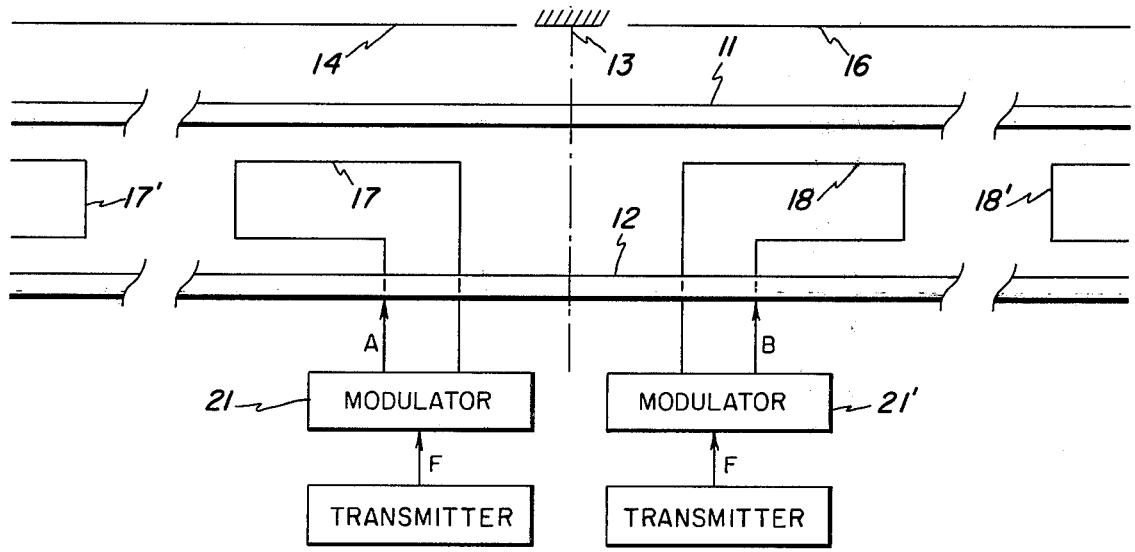
FIG. 1
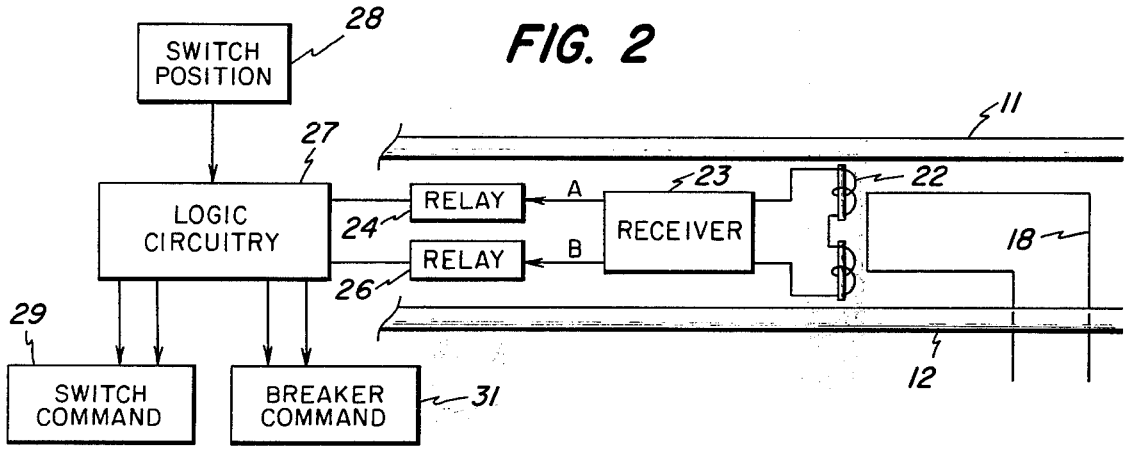
FIG. 2
FIG. 4
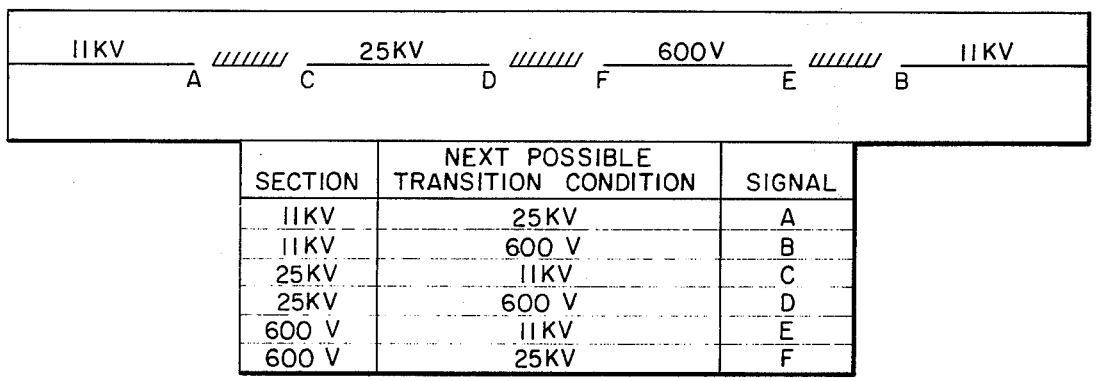

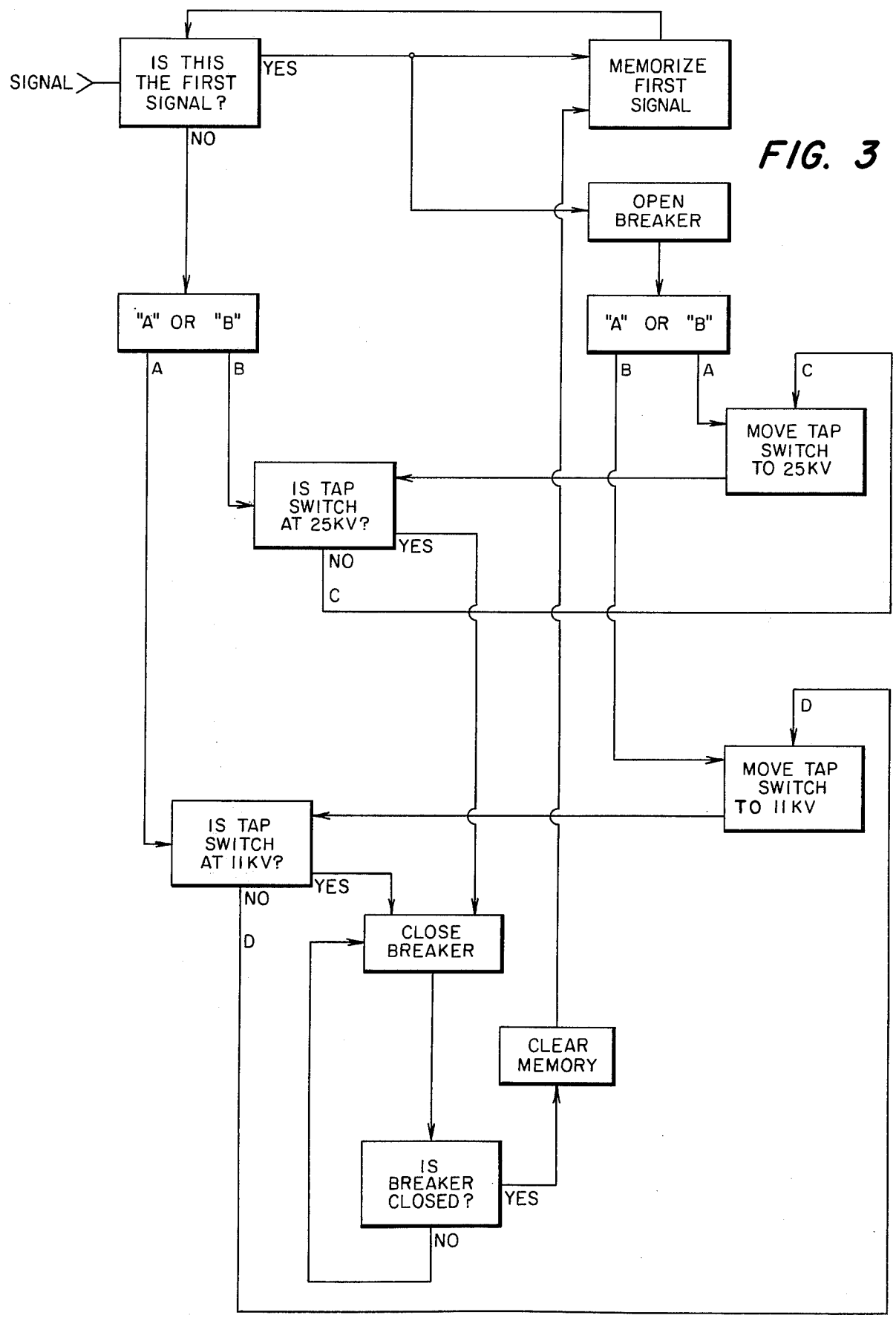

METHOD AND APPARATUS FOR TRANSITIONING DIVERSE POWER SOURCES TO RAIL VEHICLES

BACKGROUND OF THE INVENTION

This invention relates generally to rail vehicle power interconnection systems and more particularly to the sequential shifting between plural supply circuits.

In electric railway propulsion systems power is provided to the vehicle either by an on-board power plant or by a wayside power distribution system which is energized by stationary power plants located along the railway. Common methods of power distribution from the wayside include a third-rail-to-shoe combination and an overhead catenary-to-pantograph combination.

It is often desirable to use a power source having electrical characteristics of one type for one section of the railway and one having different characteristics for an adjacent section of the railway. For example, one section may require a d-c power source while the adjacent section may better be served by an a-c source, or it may be preferred to have either different voltages or different frequencies on the two sections. In any case it is necessary to provide a means of transitioning from one source to the other.

A simple method of accomplishing this is to provide a transition buffer zone between the two sections in which there is no power applied and through which the vehicle coasts. This is undesirable since the buffer zone must be at least as long as the train, and a shut down of the power for such a long period would disrupt the speed and efficiency of the train.

An alternative is to overlap the two power supply systems for a distance as great as or greater than the length of the train. During that period of time both sources are simultaneously available and power reconnection can be made in a brief interval. This is a workable solution where the transition is between a third rail and a catenary or vice-versa. However, where it is between two catenaries or two third rail sections, then paralleled collectors will cause a short between the two, resulting in a fault in the system.

It is therefore an object of this invention to provide for a smooth transition between two adjacent power sources to a rail vehicle.

Another object of this invention is the provision for disconnecting from a vehicle, a power source having one electrical characteristic and connecting one having another electrical characteristic.

Yet another object of this invention is the provision for transitioning between two incompatible power sources without any appreciable loss of vehicle speed.

Still another object of this invention is the provision for disconnecting and connecting imcompatible power sources to a vehicle in a proper sequence so as not to allow a short circuit between the two sources.

Another object of the invention is the provision of an automatic power transitioning system for operation with the vehicle traveling in either direction.

A further object of this invention is the provision for a power source transitioning system which is economical to manufacture and effective in use.

These objects and other features and advantages become more readily apparent upon reference to the following description when taken in conjunction with the appended drawings.

SUMMARY OF THE INVENTION

Briefly, in accordance with one aspect of the invention, two incompatible systems on a rail vehicle are sequentially de-activated and activated, respectively, by a pair of signal devices spaced along the trackway, one system being inactivated when the vehicle receives a signal from the first device and the other system being activated when the vehicle receives a signal from the second device.

By a further aspect of this invention a pair of signal devices are placed on the trackway, one on either side of the transition point between two adjacent wayside power systems of differing electrical characteristics. When the vehicle reaches the first signal device, a receiver system is caused to disconnect the first power supply, and when it reaches the second signal device the receiver system is responsive to connect the second power supply to the vehicle. In this way, when a train having a multitude of cars passes through the transition point, each car is independently disconnected and connected in the proper sequence to ensure a smooth transition without any significant disruption of power.

In accordance with another aspect of this invention the first signal will cause, in addition to disconnection of the first power source, a checking of that condition and the enabling of the second source connection. The second signal will then cause the enabling condition to be checked and the second power source to be connected.

These objects and other features and advantages become more readily apparent upon reference to the following description when taken in conjunction with the appended drawings.

BRIEF DESCRIPTION OF THE DRAWINGS

FIG. 1 is a schematic representation of the wayside signaling apparatus in accordance with the preferred embodiment of the invention.

FIG. 2 is a schematic diagram of the associated receiving apparatus located on the rail vehicle.

FIG. 3 is a flow chart logic diagram in accordance with the preferred embodiment of the invention.

FIG. 4 is a chart giving the signal requirements for a system having three different supply voltages.

DESCRIPTION OF THE PREFERRED EMBODIMENT

Referring now to FIG. 1, a pair of spaced parallel rails 11 and 12 are shown as part of a conventional railway system for electrically propelled vehicles such as locomotives or transit cars. Power is distributed from the wayside to the vehicles (not shown) by way of a conventional catenary pantograph and/or third rail shoe arrangement. A transition point 13 is shown wherein on one side thereof the catenary power source 14 is of one frequency and voltage level (e.g. 11 KV, 25 Hz) and on the other side thereof the catenary power source 16 is of another frequency and voltage level (e.g. 25 KV, 60 Hz). This is often necessary because of certain distribution and vehicle requirements as are brought about by the variable nature of the trackway locale. For example, higher voltages are economically feasible for surface lines while tunnel construction requires lower voltages because of clearance considerations. In another example, modern electric propulsion systems can operate on 60 Hz commercial frequency which is expected to replace existing 25 Hz railway supplies as the latter equipment reaches the end of its economic life. It should be noted that this invention is equally applicable to any rail vehicle power distribution system wherein a transition is made between power sources of different characteristics. For example, it would be applicable as between those of different voltages or frequencies, between an a-c power source and a d-c power source, or between a third rail power supply and a trolley.

A pair of loops 17 and 18 are placed along the wayside, preferably between the track, one on each side of the transition line 13. A similar arrangement is represented by the coils 17' and 18' which are located up and down the track respectively. In other words, where there are alternate sources of power the coils will be in a sequence such as 17', 17, 18, 18', etc. with the 17 series providing one signal characteristic and the 18 series providing another signal characteristic. The distance between the loops 17 and 18 is a matter of design and is dependent on intended vehicle speed; however, it is necessary that they be placed a minimum distance apart so as not to allow the simultaneous effect on the associated vehicle apparatus as will be recognized hereinafter. The purpose of the loops 17 and 18 is to generate signals in the vicinity, but on opposite sides, of the transition line 13 between the diverse wayside power sources 14 and 16, which signals can be detected on board the moving vehicle to indicate that the vehicle is positioned on one side or the other of the transition. Toward this end, the two loops are respectively energized by modulated signals received from a pair of transmitters so labeled in FIG. 1. These transmitters are suitably constructed and arranged to transmit continuous signals on the same carrier frequency F, which signals are then modulated by conventional apparatus 21 and 21' to obtain two different signals A and B for the respective coils 17 and 18. It is understood that a single transmitter can be used in place of the pair of transmitters. Although the carrier signal may be either amplitude or frequency modulated, the preferred method is to use amplitude modulated with two specific code rates to pulse the carrier signal, with each code rate representing the voltage and/or frequency on its side of the transition point 13. The two signals A and B are thus continuously carried by the loops 17 and 18 respectively and are used in reversible succession to effect switching functions aboard the vehicle as it passes over the transition point 13.

Located on-board each vehicle is an inductive pick up coil 22 and an associated receiver 23 mounted in a position such that when the vehicle passes over either of the coils 17 or 18 the respective signal is transmitted by inductive coupling to the pick up coil 22 and to the receiver 23. The receiver output operates the signal relays 24 and 26 in response to the signals A and B, respectively, and the logic circuit 27 in turn changes from one operating power connection to the other as the vehicle crosses the transition point. Sub-circuitry within the logic circuit 27 is activated in response to the operation of the relays 24 and 26 and comprises a switch position indicator 28 which senses the position of the power tap switch and provides the appropriate signal to the logic circuit 27; a switch command circuit 29 which operates to selectively position the power tap switch; and a breaker command circuit 31 which operates to selectively open or close a circuit breaker to the power collector. The logic circuitry 27 thus uses the signals from the relays 24 and 26 to activate solenoid connections and interlock contacts from the transformer tap switch and pantograph circuit breaker to reliably change from one operating power connection to the other as each car crosses the transition point.

Assuming a change is required between a pantograph source of 11 KV, 25 Hz to a pantograph source of 25 KV, 60 Hz, the sequence of operation is as follows:

a. When a car passes over loop 17 (from left to right in FIG. 1) a signal A will go to the receiver 23 which will energize the relay 24 and the logic circuitry will cause the following:
 1. the circuit breaker on the car will open to interrupt the 11 KV, 25 Hz power source and check that it is open (Block 31, FIG. 2); and
 2. after ensuring that the circuit breaker is open the tap switch is changed to the 25 KV, 60 Hz, position (Block 29, FIG. 2);

b. When the car arrives over loop 18, the receiver will energize signal relay 26 and the logic circuitry will further cause the following:
 1. the interlock will be checked to ensure that the tap switch is in the 25 KV, 60 Hz position (Block 28);
 2. the breaker will be closed to connect the 25 KV, 60 Hz source; and
 3. the memory initiated by signal A will be cleared so that the system will be ready for the next signal B which will cause a return to the 11 KV operation in a similar manner.

Referring now to FIG. 3 a logic flow diagram is shown as it occurs in response to signals A or B acting through the relays 24 and 26. Tracing through the diagram, a determination is first made as to whether this is the first of the two signals. Assuming it is, that signal is memorized by the relay and at the same time the car circuit breaker is opened. If an A signal was received the tap switch will be moved to the 25 KV position and if a B signal was received the tap switch will be moved to the 11 KV position. Subsequently, the opposite signal will be received as a result of passing over the second coil and the system will be checked by a well known concept using a relay contact string to see if the tap switch is in the appropriate position. If it isn't, then a process will be automatically initiated to change the switch to the second position. Subsequently it is again automatically checked to see if it is in the proper position. If it is still not in position, then nothing further will happen until another signal is received at the next transmitter coil, and the car will be dead for the interim period. When this occurs another circuit alarms the operator to the condition and he may take appropriate action to manually move the switch to the second position. If the tap switch is initially or subsequently found to be in the appropriate position, then the car circuit breaker is closed, the resumption of power will occur, and the memory will be cleared so as to ready the system for the next signal.

Since the on-board equipment will respond to two types of signals (A and B) as a function of the order in which they are received, bi-directionality on the same section of track is attained. Thus if the train is powering from 25 KV and encounters, for example, an A signal as the first input, the input discriminators will translate this to a command for 11 KV connection. When the B signal is encountered it will be the second input and will therefore also be translated to a command for 11 KV connection. In the opposite direction the B signal is received first and results in a 25 KV command, and the A signal is received second and will also bring about a 25 KV command.

It should be noted that if all cars on a multi-car train are oriented in the same way, then only one car will be dead at a time, and there is thus no restriction on stopping in the transition zone. However, once a train enters the first loop and receives the first signal, it cannot reverse direction until it has cleared the second loop. Otherwise, its tap switch position will not coorrespond to the voltage level represented by second reception of the first signal and it will remain dead since its circuit breaker cannot close.

Assume now that there are three different voltages represented by the power source to the train, 11 KV, 25 KV and 600 V. Then, for bi-directionality it is necessary to have a total of six different signals as shown in FIG. 4. Similarly, if there are four different voltages, then there would be twelve different signals required. However, the most common requirement is where only two different conditions exist, and the transition between these can be simply made as described hereinbefore. It should be noted that the same concept can be used to control other desired events which are a function of vehicle location, for example, the switching on and off of lights as the vehicle enters and leaves a tunnel. Also, the communication link may be provided by other means such as, for example, a configuration of iron bars on the wayside and a magnetic detection device on the train, or a photo electric receiver and a target configuration.

What I claim as new and desire to secure by Letters Patent of the United States is:

1. An apparatus for transitioning between adjacent diverse wayside power sources to a rail vehicle comprising:
   a. a first signal device disposed along the trackway on a first side of the transition point;
   b. a second signal device disposed along the trackway on the second side of the transition point; and
   c. a receiver disposed on the vehicle such that when the vehicle passes from said first side to said second side it is sequentially responsive to said first and second signal devices for disconnecting from the vehicle the wayside power source on said first side, changing a power switch on board the vehicle from the first side source position to a second side source position, and connecting to the vehicle the wayside power source on said second side of said transition point.

2. An apparatus as set forth in claim 1 wherein said receiver is responsive to said second signal device to close the power circuit to connect said second side power source to the vehicle.

3. An apparatus as set forth in claim 2 wherein said receiver is further responsive to said second signal device to initially check to ensure that said power switch was changed from said first side source position to said second side source position before closing said power circuit.

4. An apparatus as set forth in claim 1 wherein said first and second signal devices provide different signals to said receiver.

5. An improved power connection apparatus for a rail vehicle having successive diverse wayside power sources, wherein the improvement comprises:
   a. first signal means disposed along the wayside in the vicinity of a first power source;
   b. second signal means disposed along the wayside in the vicinity of a second power source;
   c. means on the vehicle responsive to said first signal means for automatically disconnecting said first power source from the vehicle and responsive to said second signal means for automatically connecting said second power source to the vehicle.

6. An improved power connection apparatus as set forth in claim 5 wherein said first and second signal means are electrical loops carrying electrical signals of predetermined characteristics.

7. An improved power connection apparatus as set forth in claim 6 wherein the electrical signals of said first and second signal means have different characteristics.

8. An improved power connection apparatus as set forth in claim 5 wherein said signal means responsive means comprises an inductive coil located so as to enter the range of said first and second signal means in sequence when the vehicle passes from said first to said second power source, respectively.

9. An improved power connection apparatus as set forth in claim 8 wherein there is a lag between the time said responsive means enters the range of said first signal means and the time it enters the range of said second signal means.

10. An apparatus as set forth in claim 5 wherein the operation of said signal means responsive means is reversible such that when the vehicle passes from said second to said first wayside power sources said responsive means responds to said second signal means to disconnect said second power source from the vehicle and then responds to said first signal means to connect said first power source to the vehicle.

11. An improved method of transitioning between succcessive diverse wayside power sources supplying power to an electrically propelled rail vehicle comprising the steps of:
   a. automatically opening a circuit on board the vehicle as the vehicle approaches a predetermined transition point between the diverse power sources along the wayside to disconnect the vehicle from the wayside power source disposed on the side of said transition point from which the vehicle is approaching, and
   b. automatically closing said circuit when the vehicle passes to the opposite side of said transition point, thereby connecting the vehicle to another wayside power source disposed on said opposite side of said transition point.

12. An improved method of transitioning as set forth in claim 11 and including between said circuit opening and closing steps an additional step of changing a power switch on board the vehicle from a first power source position to a second power source position.

13. An improved method of transitioning as set forth in claim 12 wherein said additional step is initiated in response to said circuit opening step.

14. An improved method of transitioning as set forth in claim 13 and including after said additional step but prior to said circuit closing step the further steps of checking that said power switch is in its second power source position and, if said power switch is not already in said second position, of changing said power switch to the latter position.

* * * * *